United States Patent [19]

Crippa

[11] Patent Number: 5,993,140
[45] Date of Patent: Nov. 30, 1999

[54] APPARATUS FOR LOADING PIPES ONTO PROCESSING MACHINES

[75] Inventor: Aurelio Crippa, Arosio, Italy

[73] Assignee: Fabrica Macchine Curvatubi Crippa Agostino, S.p.A., Italy

[21] Appl. No.: 09/034,832

[22] Filed: Mar. 4, 1998

[30] Foreign Application Priority Data

May 30, 1997 [EP] European Pat. Off. .............. 97830262

[51] Int. Cl.[6] .................................................. B21C 37/00
[52] U.S. Cl. ................................ 414/744.1; 198/487.1; 74/490.01; 414/744.5; 414/745.1
[58] Field of Search .................. 414/735, 744.5, 414/744.6, 746.5, 745.1, 744.1; 74/490.01, 490.03; 198/487.1

[56] References Cited

U.S. PATENT DOCUMENTS

| 2,649,975 | 8/1953 | Brooks | 414/744.5 |
|---|---|---|---|
| 2,811,267 | 10/1957 | Bock | 414/744.5 |
| 4,204,441 | 5/1980 | Makoto . | |
| 4,432,691 | 2/1984 | Sterner | 414/735 |
| 4,872,380 | 10/1989 | Franz et al. . | |
| 5,458,454 | 10/1995 | Sorokan | 414/22.62 |

FOREIGN PATENT DOCUMENTS

| 1399066 | 5/1988 | U.S.S.R. | 414/745.1 |
|---|---|---|---|
| 2 026 361 | 2/1980 | United Kingdom . | |

*Primary Examiner*—Robert P. Olszewski
*Assistant Examiner*—Gregory A. Morse
*Attorney, Agent, or Firm*—Robert F. I. Conte; Lee, Mann, Smith, McWilliams, Sweeney & Ohlson

[57] ABSTRACT

An apparatus for loading pipes onto processing machines, in particular pipe-bending machines, is provided which comprises a handler arm (8) consisting of a first segment (9) and a second segment (10) disposed in succession, and kinematic members (12) adapted to determine a fixed ratio between the rotation angles of said segments about the respective hinging axes.

7 Claims, 3 Drawing Sheets

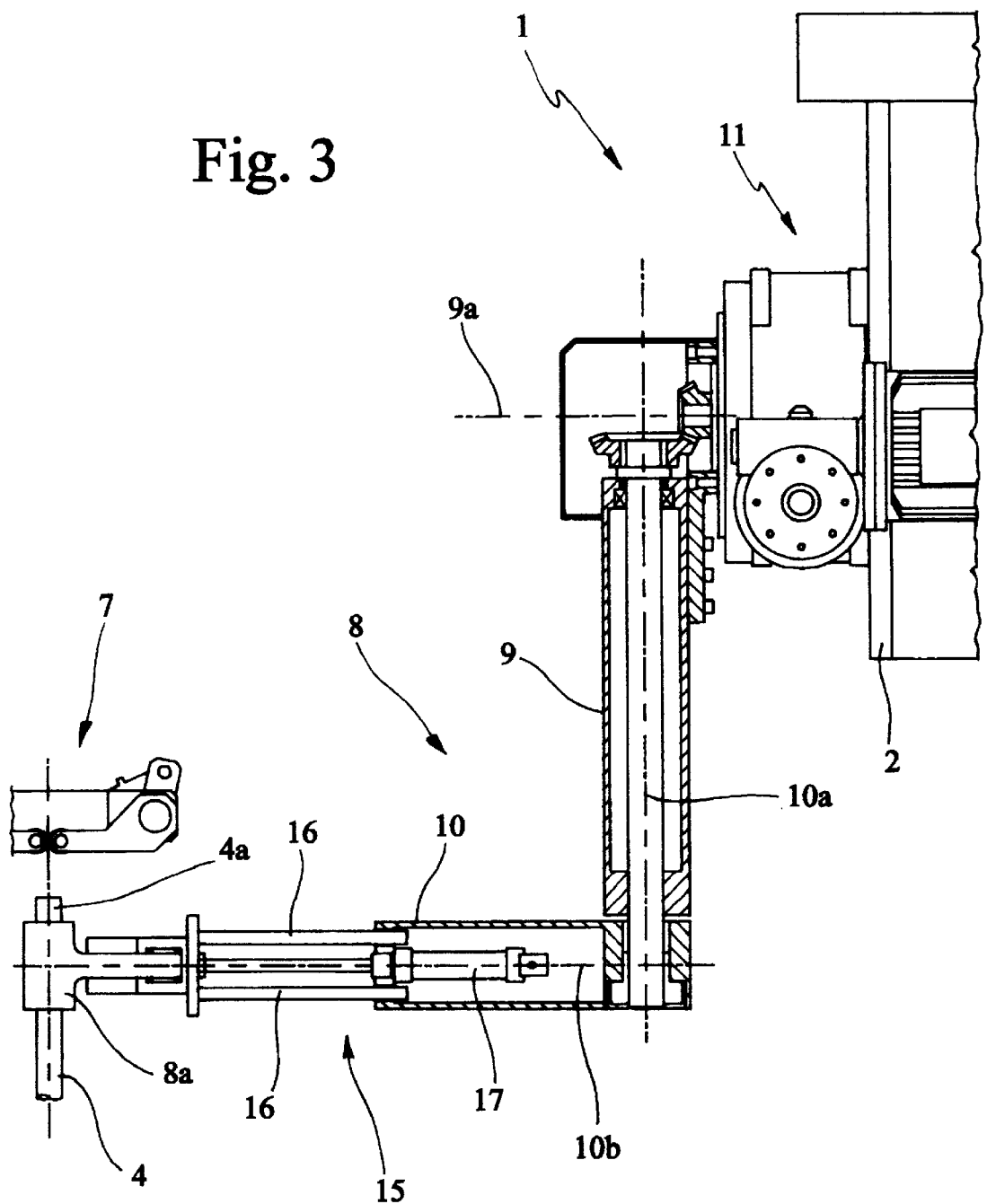

APPARATUS FOR LOADING PIPES ONTO PROCESSING MACHINES

FIELD AND BACKGROUND OF THE INVENTION

The present invention relates to an apparatus for loading pipes onto processing machines, in particular pipe-bending machines, comprising a support base, a handler arm associated with said base and provided at the end with grip members for holding a pipe fast, and drive means for said handler arm.

It is known that in some types of processing machines intended to carry out machining on pipes even of great length, such as machines provided with appropriate pipe-bending heads and special movable mandrels having cores to be fitted into the pipes so as to cause displacement and rotation of the latter about their axes during the different operating steps, each pipe is required to be oriented horizontally and the end thereof into which said core is to be inserted must be placed substantially at the front portion of the pipe-bending machine.

Therefore, each pipe must be picked up and moved from the station or magazine arranged for storing pipes in an orderly manner until the intended position close to the processing machine, by appropriate loadhng means or apparatuses.

According to a first known technique, the pipe magazine is located at a position substantially in front of the pipe-bending machine at an appropriate distance therefrom, so that said loading apparatus must only carry out a mere translation of each pipe.

However, this technical solution involves some drawbacks in that, if the pipe magazine is located close to the pipe-bending machine, said machine may undergo important operating restrictions since an appropriate room at the area in front of the machine itself is not available for receiving the pipe portions that have been submitted to bending. On the other hand, if the pipe magazine is located very far from the pipe-bending machine, availability of very wide operating areas is required, which is often inconsistent with a rational and economical management of the whole plant.

In order to overcome the above drawbacks, according to a second known technique, the pipe magazine is disposed longitudinally in side by side relationship with the pipe-bending machine at an appropriate although not great distance therefrom. However, with this technical solution that, on the other hand, enables bulkiness in plan of the whole plant to be limited at most, employment of a loading apparatus is required which consists of a true robotized handler capable of picking up and moving each pipe from the magazine to the operating position required by the pipe-bending machine, that is in the extension of the front portion of said machine, in alignment with the axis of the machine mandrel. The handler therefore must grasp each pipe close to a front end relative to the pipe-bending machine, carry out overturning of the grasped pipe so that the front end becomes the rear end into which the core associated with the pipe-bending machine mandrel is to be fitted and finally translate or overturn the pipe again until a position at which the pipe is in alignment with the axis of said mandrel.

The known art briefly described above however, has some drawbacks.

Actually, the handler to be used for obtaining transferring and positioning of each pipe consists of at least two independent units each assigned to displacement of the grasped pipe about its own hinging axis.

Each movement unit practically defines an independent apparatus requiring sensors of its own and control units suitably coordinated in order to obtain precise positioning to be repeated with a high-accuracy degree. Therefore, costs of such a handler are high and at all events its reliability cannot be completely sure because it is based on the presence of complicated control systems that are often subjected to a non-negligible percentage of failures.

In addition, in the known art there is some rigidity as regards both possible deposit heights of each pipe in the magazine and the needed distance between the magazine and the pipe-bending machine.

SUMMARY OF THE INVENTION

Under this situation, the technical task underlying the present invention is to conceive an apparatus for loading pipes onto processing machines capable of substantially obviating the above mentioned drawbacks.

Within the scope of this technical task it is an important object of the invention to conceive a pipe loading apparatus enabling a precise displacement of each pipe to a predetermined position to be obtained in a thoroughly reliable manner, thereby greatly reducing controls to be carried out, which apparatus is also of simple construction and limited costs.

In addition, it is an important object of the invention to conceive a pipe loading apparatus enabling both the grasping height of a pipe from the magazine and the distance of the magazine from tihe pipe-bending machine to be maintained appropriate to the operating requirements usually present.

The technical task mentioned and the objects specified are substantially achieved by an apparatus for loading pipes onto processing machines, in particular pipe-bending machines, wherein said handler arm comprises a first segment in engagement with said support base in a rotatable manner about a first hinging axis and a second segment disposed in succession to the first segment and in engagement with said first segment in a rotatable manner about a second hinging axis, and wherein said drive means comprises kinematic connecting means between the first and second segments for determining a fixed and pre-established ratio between the rotation angles of said segments about the respective hinging axes.

BRIEF DESCRIPTION OF THE DRAWINGS

Description of a preferred, but non-exclusive, embodiment of a pipe loading apparatus in accordance with the invention is now given hereinafter, by way of non-limiting example, with reference to the accompanying drawings, in which:

FIG. 3 is a top view of the apparatus shown in FIG. 1 at a final operating position.

DESCRIPTION OF THE PREFERRED EMBODIMENT

Figure 1:
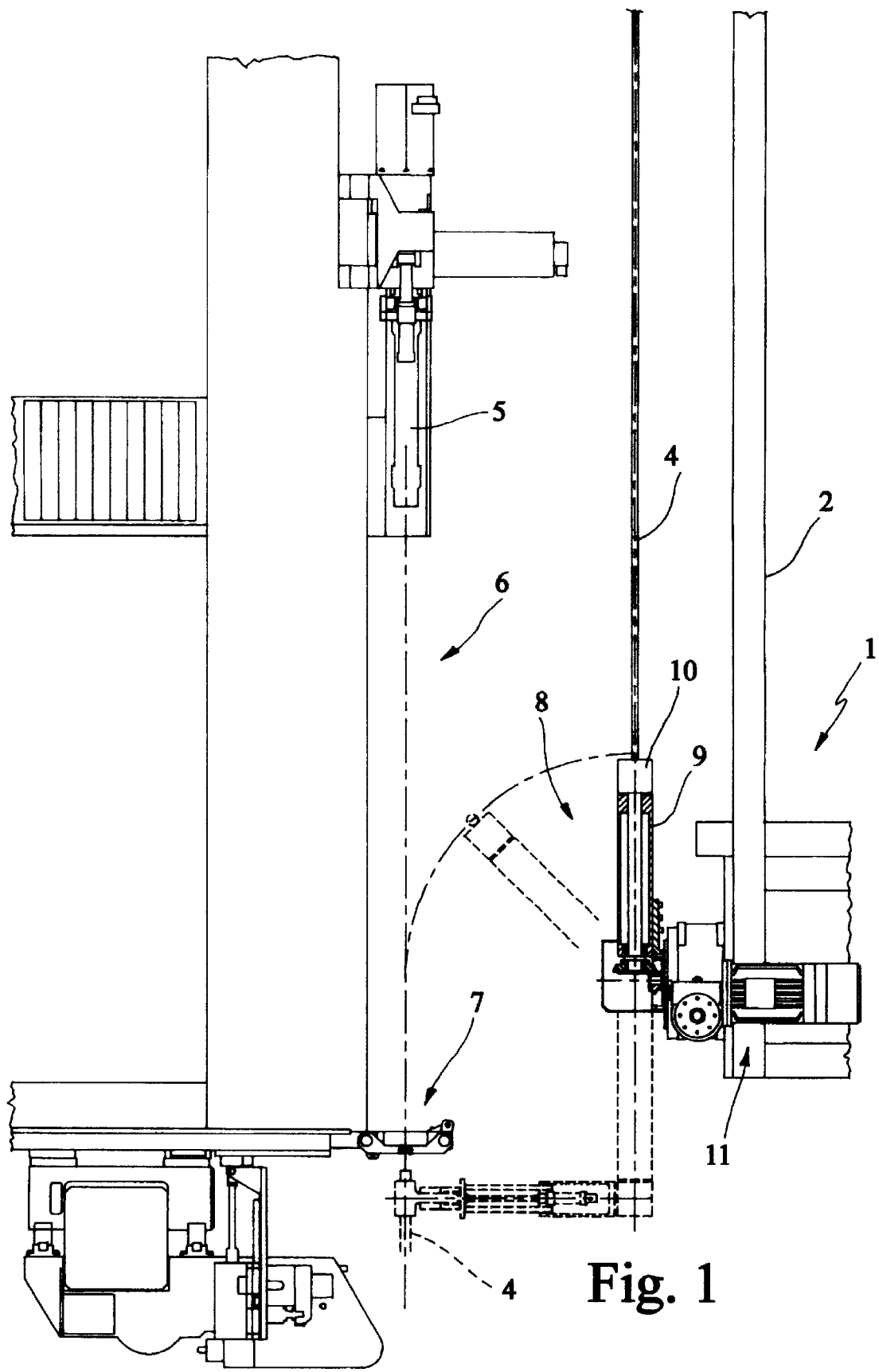
FIG. 1 is a diagrammatic top view of a pipe-bending machine and a loading apparatus in accordance with the invention at a starting operating position.

With reference to the drawings, the apparatus of the invention has been generally identified by reference numeral 1.

It comprises a support base 2 at the lower part of which a magazine 3 is provided which is adapted to receive pipes 4 in an orderly manner and in a horizontally-oriented arrangement, parallel to the extension direction of a mandrel 5 of a pipe-bending machine 6, of a type known per se, provided with an operating head 7 disposed at the front.

Associated with the support 2, at the base thereof, there is a handler arm 8 provided at the end with a grip member 8*a* capable of holding a pipe 4 fast at a front end 4*a* by an appropriate locking action enabling movement thereof.

The handler arm 8 comprises a first segment 9 in engagement with the support base 2 in a rotatable manner about a first hinging axis 9*a* oriented horizontally and a second segment 10 disposed in succession to the first segment and in engagement with the latter in a rotatable manner about a second hinging axis 10*a*. It is to note that the first segment is practically connected to a rotating element or flange, rotatably carried by the base 2 and suitably driven in rotation by drive means 11. More precisely, segments 9 an 10 are moved about their hinging axes by drive means 11 comprising kinematic connecting members 12 between the first and second segments, adapted to give rise to a fixed and pre-established ratio between the rotation angles of the segments themselves about said hinging axes.

The first segment 9 and second segment 10 respectively have a first axis of longitudinal extension coincident with the second hinging axis 10*a* and a second axis of longitudinal extension 10*b*, perpendicular to the second axis 10*a*, both of rectilinear conformation.

The kinematic members 12 comprise a drive shaft 13 of the second segment 10 rotatably in engagement with the first segment 9 and defining the second hinging axis 10*a*.

More specifically, the shaft 13 is fitted internally of the first segment 9, preferably of tubular conformation, and comprises an end portion 13*a* integral with a starting end 10*c* of the second segment 10, and a starting portion 13*b*, disposed close to the first hinging axis 9*a* and associated with driving elements 14 for transmitting the circular motion of the first segment 9 to shaft 13.

The driving or transmission elements 14 are defined by a pair of bevel wheels comprising a first wheel 14*a* integral with the starting portion 13*b* of shaft 13 and a second fixed wheel 14*b*, i.e. integral with the support base 2, and having a central axis coincident with the first hinging axis 9*a*.

Advantageously, the pair of bevel wheels 14 has a transmission ratio equal to 2, i.e. adapted to impose a rotation angle of shaft 13 corresponding to half the rotation angle carried out by the first segment 9 about the first hinging axis 9*a*.

Preferably disposed on the second segment 10 is movement means 15 adapted to translate the grip members 8*a* along the second axis 10*b*, that is in the longitudinally extending direction of segment 10, according to strokes of controlled and adjustable amount. This movement means 15 comprises guide means, defined by one or two guide bars 16 for example, and an actuator, a fluid-operated cylinder 17 for example, active on the grip members 8*a* in the extension direction of said guide bars.

Finally, the drive means 11 comprises an electric motor 18 and a transmission unit 19 disposed downstream of the electric motor and adapted to drive the first segment 9 in rotation about the first hinging axis 9*a* at a precise rotation angle of a predetermined value that, in the present application, is 180°. It is advantageous for the transmission unit to be of a type capable of providing a fixed angular output rotation so that, practically, motion-control members are not required.

Operation of a pipe loading machine described above mainly as regards structure is as follows.

Initially, for picking up a pipe 4 from the magazine and holding it fast, the first segment 9 is oriented horizontally and the second segment 10 is disposed vertically downwardly (see FIG. 1).

Due to the rotation imposed by the drive means 11, overturning of the first segment 9 through 180° about the first hinging axis 9*a* occurs together with the simultaneous rotation through 90° of the drive shaft 13 and thus of the second segment 10 about the second hinging axis 10*a* submitted to overturning together with the first segment 9.

The second segment 10 therefore performs a displacement that brings it from a starting vertical position to a final horizontal orientation (see FIG. 3).

Figure 2:
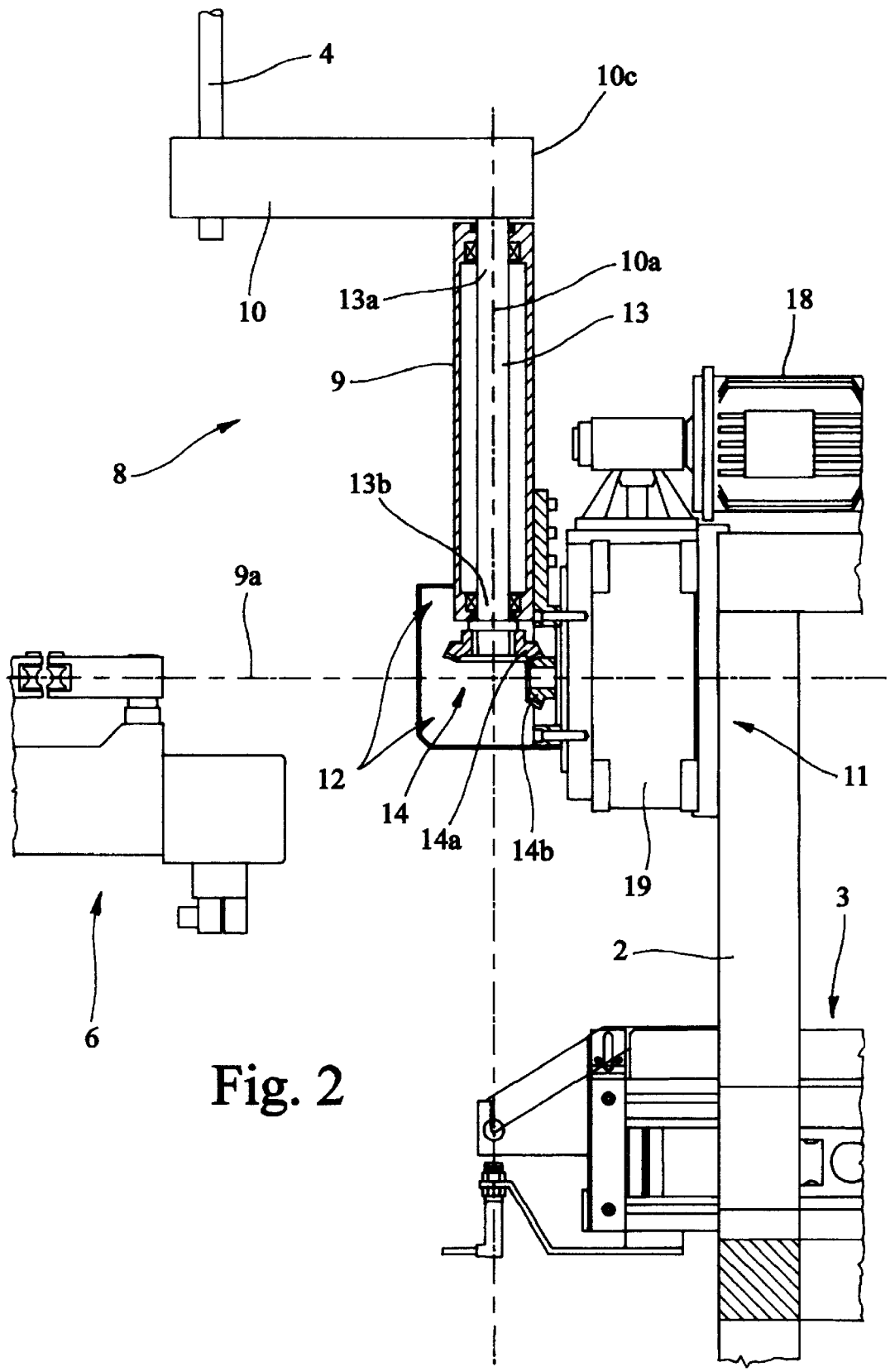
FIG. 2 is an elevation front view partly in section of the apparatus shown in FIG. 1 at an intermediate operating position.

Pipe 4, grasped at its front end 4*a*, describes a complex trajectory that, starting from an initial horizontal orientation passes through a vertical orientation when the first arm 9 is rotated through 90° (see FIG. 2) and terminates at a final position still having a horizontal orientation but overturned by 180° and translated both transversely to the pipe axis and in the pipe direction, so as to put the hole of the front end 4*a* turned towards the mandrel axis 5 for carrying out the subsequent operating steps of the pipe-bending machine.

It is to note that, at this point, the front end 4*a* engaged by the grip means 8*a* is at a position in front of the bending head and can be therefore easily engaged by mandrel 5 either if the pipe-bending machine has to carry out a core-free bending machining or if in the bending area there is the presence of a core.

With reference to the last mentioned situation, it is to point out that, advantageously, the end portion 4*a* is at such a final position that it can be easily fitted on the core before bending is carried out.

The movement means 15 practically enables the length of the second segment 10, i.e. the distance of the grip members 8*a* from the second hinging axis 10*a*, to be varied, and therefore allows this distance in an initial position to be reduced during the step of picking up the pipe from the magazine when the second segment 10 is disposed vertically downwardly and the same distance to be increased in a final position when the whole horizontal stretch included between the longitudinally extending axis of the first segment 9 and the mandrel axis of the pipe-bending machine is to be covered.

The invention achieves important advantages.

Actually, the circular movements of the segments forming the handler arm of the apparatus are determined in an univocal manner and are intrinsically connected with each other because they are imposed by mechanical members keeping a severe and reliable ratio between the rotation angles of the segments themselves.

Therefore, additional control devices are not necessary in order to verify and coordinate the provided rotations of each handler segment.

It is finally to point out that, since translation of the grip members on the second segment can be adjusted, employment of the apparatus is particularly flexible and adaptable to many concrete operating situations.

Practically, the apparatus in question can be adjusted so as to pick up pipes from magazines located at different heights and to bring these pipes close to bending heads that are not rigorously at a predetermined distance from apparatus 1.

In addition, by virtue of the particular movement imparted to the pipe, the minimum spaces required for installing apparatus 1 and the corresponding pipe-bending machine can be greatly limited. At the same time much room is obtained at the area in front of the pipe-bending machine so that, in the different bending steps, the bent portion of the pipe does not interfere with the apparatus.

Finally, should the available spaces allow it, apparatus 1 can be installed to a relatively high distance from the pipe-bending machine, so as to have a great area at the back of the bending head, where the pipe portion already bent can be freely disposed without interfering with apparatus 1.

This does not involve particular modifications to the kinematic mechanisms of the machine that, by operating with predetermined angular movements, are not affected by possible elongations of the grip members 8a (upon the action of the movement means 15) or possible modifications as regards length of segments 9 and/or 10.

What is claimed is:

1. An apparatus for loading pipes onto processing machines comprising a support base (2), a handler arm (8) associated with said base and provided at the end with grip members (8a) for holding a pipe (4) fast, and drive means (11) for said handler arm, wherein said handler arm (8) comprises a first segment (9) in engagement with said support base in a rotatable manner about a first hinging axis (9a) and a second segment (10) disposed in succession to the first segment and in engagement with said first segment in a rotatable manner about a second hinging axis (10a), said first and second segment (9, 10) have first and second longitudinally extending axes, said first hinging axis (9a) being disposed at a starting end of said first segment and being oriented perpendicularly to said first longitudinally extending axis and said second hinging axis (10a) being substantially coincident with said first longitudinally extending axis, and wherein said drive means comprises kinematic connecting means (12) between the first and the second segment for determining a fixed and pre-established ratio between the rotation angles of said segments about the respective hinging axes.

2. An apparatus as claimed in claim 1, wherein said drive means comprises an electric motor (18) and a transmission unit (19) disposed downstream of said electric motor and adapted to drive in rotation said first segment about said first hinging axis through a rotation angle of predetermined value.

3. An apparatus as claimed in claim 1, wherein said kinematic members (12) comprise:

a drive shaft (13) of the second segment (10) rotatably in engagement with said first segment (9) and defining the second hinging axis (10a), said drive shaft having an end portion (13a) integral with a starting end of said second segment (10) and a starting portion (13b) disposed close to said first hinging axis (9a), and driving elements (14) for transmitting the circular motion of said first segment (9) to said drive shaft (13), which elements are associated with said starting portion (13b) of the drive shaft itself.

4. An apparatus as claimed in claim 3, wherein said driving elements (14) are defined by a pair of bevel wheels comprising a first wheel (14a) integral with said starting portion (13b) of the drive shaft (13) and a second wheel (14b) integral with said support base (2) and having a central axis coincident with said first hinging axis (9a).

5. An apparatus as claimed in claim 4, wherein said pair of bevel wheels (14a, 14b) has a transmission ratio adapted to determine a rotation angle of said drive shaft (13) of the second segment (10) equal to half the rotation angle of said first segment (9).

6. An apparatus as claimed in claim 1, wherein said handler arm (8) comprises movement means (15) disposed on said second segment (10) and adapted to move said grip members (8a) along said second longitudinal extending axis following strokes of controlled and adjustable amount.

7. An apparatus as claimed in claim 6, wherein said movement means (15) comprises at least one guide bar (16) integral with said grip members and slidably in engagement with said second segment and an actuator active on said grip members in the direction of said guide bar.

* * * * *